S. HUFFMAN.
Support for Pillows.

No. 230,633.                     Patented Aug. 3, 1880.

Witnesses
Fred. G. Dietrich
B. L. Dietrich

Inventor
Samuel Huffman

UNITED STATES PATENT OFFICE.

SAMUEL HUFFMAN, OF MATANZAS, KANSAS.

SUPPORT FOR PILLOWS.

SPECIFICATION forming part of Letters Patent No. 230,633, dated August 3, 1880.

Application filed January 7, 1880.

*To all whom it may concern:*

Be it known that I, SAMUEL HUFFMAN, of Matanzas, Kansas, have invented an Improvement in Supports for Pillows, of which the following is a specification.

My invention consists in a ventilating-platform so constructed as to be attached to the head-board of a bedstead adapted to support a pillow, and to be raised and lowered by the devices hereinafter more fully described and claimed.

Figure 1:
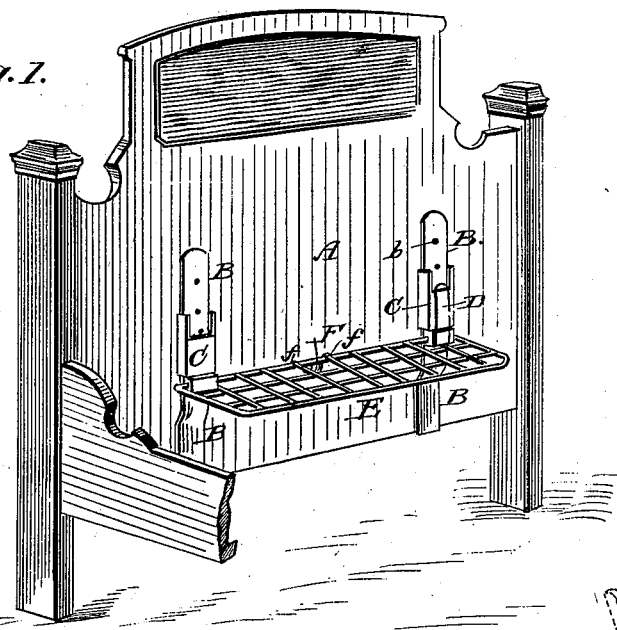
Figure 2:
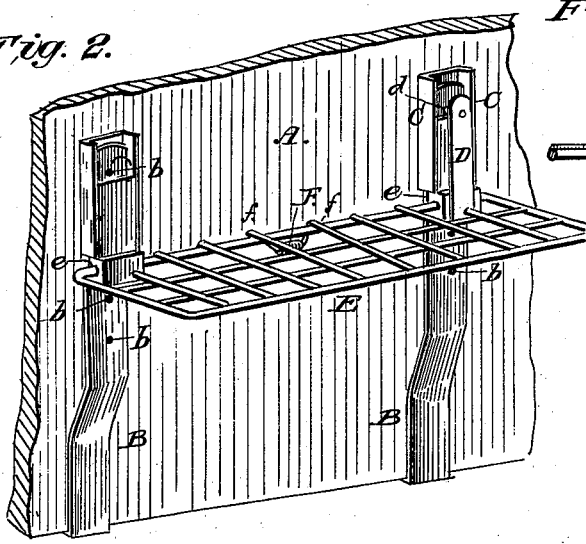
Figure 3:
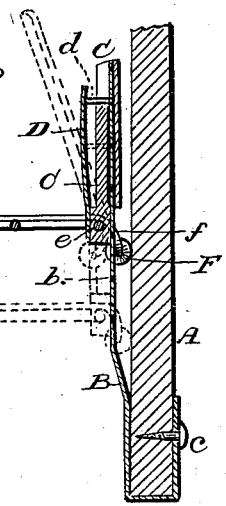

Figure 1 is a perspective view of my invention attached to a head-board, showing the support ready to receive a pillow, but let down to its lowest position. Fig. 2 represents the support raised to a higher position than is shown in Fig. 1. Fig. 3 is a side or end view of head-board with the pillow-support raised in the different positions necessary, and also showing the devices for holding it in the desired positions.

In my invention I use two stationary guides attached to the head-board or other convenient parts of the bed. (Represented by the letters B in Figs. 1 and 2, also 3.) These guides are supplied with holes $b$ when I use flat guides, as here shown, and a spring-pin, $d$, that falls into the holes $b$, used to stop and hold the support at the desired height.

A represents the head-board of a bed. D is a spring, to which pin $d$ is attached. The spring D is attached to the slide C.

C is a guiding-slide surrounding the guides B, and slides freely on B. C is used as bearings to support the ventilating-platform E at $e$. When it is desirable to arrange a bed the platform E may be thrown up against the head-board, as shown at Fig. 3, and bent out of the way while adjusting the bed. The platform E is easily sustained at different positions or heights by the devices shown in the different figures.

The eccentric-arm $f$ and roller F, as shown in Figs. 1, 2, and 3, will support the platform stationary at the desired height.

When the platform E is turned up, as shown by the dotted lines in Fig. 3, the roller F is freed from the head-board or bearing, and allows the platform E to be raised or lowered by moving the slides C on the guides B. When I use round upright guides B, I use cylindrical or thimble-formed guides C.

The platform E may be constructed of any suitable substance and varied in form, but is usually of lattice-work slats, for ventilating purposes.

I attach the upright guides B, as here shown, at $c$ by screws or other suitable device, or to a cross-stay below the head-board. The upper part of B is made to stand off from the head-board to allow the slides and platform to move up and down freely.

Having described my invention, what I claim, and desire to secure by Letters Patent of the United States, is—

1. The support for pillows, consisting of the vertical guides B, attached to the head-board of a bedstead, the slides C, adjustable on said guides, and the platform E, pivoted to said slides, substantially and operating as set forth.

2. The support for pillows, consisting of the vertical guides B, attached to the head-board of a bedstead, the slides C, adjusted on said guides, and the platform E, pivoted to said slides, and provided with the eccentric-arm $f$ and roller F, as and for the purpose specified.

SAMUEL HUFFMAN.

Witnesses:
WILLIAM R. CHIPLEY,
E. B. HUNTER.